(12) United States Patent
Kim

(10) Patent No.: US 6,299,562 B1
(45) Date of Patent: Oct. 9, 2001

(54) DIFFERENTIAL FOR PART-TIME 4-WHEEL DRIVE VEHICLE

(75) Inventor: Tae-Woo Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,249

(22) Filed: Dec. 23, 1999

(30) Foreign Application Priority Data

Aug. 4, 1999 (KR) .................................................. 99-32027

(51) Int. Cl.$^7$ .................................................. F16H 48/06
(52) U.S. Cl. .......................................... 475/232; 475/221
(58) Field of Search ...................................... 475/150, 221, 475/258, 261, 232, 268; 192/105 CF, 71, 114 R

(56) References Cited

U.S. PATENT DOCUMENTS

| | | | |
|---|---|---|---|
| 3,461,746 | * | 8/1969 | Schwerdhofer ........................ 475/258 |
| 3,517,573 | * | 6/1970 | Roper .................................... 475/232 |
| 3,985,045 | * | 10/1976 | Shilling et al. ........................ 475/232 |
| 4,389,909 | * | 6/1983 | Goscenski, Jr. ...................... 475/232 |
| 4,420,993 | * | 12/1983 | Woodcock ............................ 475/258 |
| 4,750,382 | * | 6/1988 | Marc ................................ 475/221 X |
| 5,057,062 | * | 10/1991 | Yamasaki et al. .................... 475/221 |
| 5,890,989 | * | 4/1999 | Yamazaki et al. .................... 475/230 |
| 5,902,206 | * | 5/1999 | Oda et al. ............................. 475/221 |
| 5,989,147 | * | 11/1999 | Forrest et al. .................... 475/150 X |
| 6,015,361 | * | 1/2000 | Yamazaki et al. .................... 475/230 |

FOREIGN PATENT DOCUMENTS

403199741 * 8/1991 (JP) ...................................... 475/231

* cited by examiner

*Primary Examiner*—Charles A Marmor
*Assistant Examiner*—Roger Pang
(74) *Attorney, Agent, or Firm*—Birch, Stewart, Kolasch & Birch, LLP

(57) ABSTRACT

A differential for a part-time 4-wheel drive vehicle. The differential includes a differential assembly disposed on a front axle shaft to allow front wheels to turn at different speeds when the vehicle is in a turn, an outer case for receiving power from a power transfer case via a front propeller shaft, the outer case being disposed around the front axle shaft while enclosing the differential assembly, and a clutch lever assembly disposed between the outer case and the differential assembly to selectively couple the outer case to the differential assembly, the clutch lever assembly being mounted on the outer case so as to operate in a coupling direction to the differential assembly by centrifugal force generated when the outer case is rotated by power transmitted from the power transfer case.

8 Claims, 4 Drawing Sheets

DIFFERENTIAL FOR PART-TIME 4-WHEEL DRIVE VEHICLE

BACKGROUND OF THE INVENTION (a) Field of the Invention

The present invention relates to a differential for a part-time 4-wheel drive vehicle, and more particularly, to a differential for a part-time 4-wheel drive vehicle that is equipped with a power cut-off device for preventing power from reversibly transmitting from the front wheels through a front propeller shaft to a power transfer case.

(b) Description of the Related Art

Generally, a part-time 4-wheel drive vehicle can be changed by the operator from a 4-wheel drive mode to a 2-wheel drive mode and vice versa. FIG. 1 shows a drive train of a conventional part-time 4-wheel drive vehicle. The terms "front" and "rear" as used herein shall mean and refer to the respective forward and rearward directions of the vehicle body. Mounted on an output side of a transmission 52 is a power transfer case 53 that is used for selectively transmitting power to either both or one of the front and rear wheel sets 60 and 57, according to a drive mode of the vehicle.

That is, the power transfer case 53 is connected to a rear differential 55 via a rear propeller shaft 54 to transmit power to a rear axle shaft 56 supporting the rear wheels 57. The power transfer case 53 is further connected to a front differential 70 via a front propeller shaft 58 to selectively transmit power to a front axle shaft 59 supporting the front wheels 60.

Accordingly, in 4-wheel drive mode, the power transfer case 52 transmits power to both front and rear wheel sets 60 and 57, and in 2-wheel drive mode, to only the rear wheel set 57.

However, in 2-wheel drive mode, power generated by the rotation of the front wheels is reversibly transmitted to the front propeller shaft 58 through the front axle shaft 59, resulting in power loss and generation of noise.

To solve the above problems, a power cut-off apparatus such as a free wheel hub system or a center axle disconnecting system have been provided between the front axle shaft and the front wheels to cut-off the power transmitted from the front wheels to the front propeller shaft.

However, the above well-known prior power cut-off apparatuses have large, complicated structures, which increases manufacturing costs.

SUMMARY OF THE INVENTION

Accordingly, there is a need for a power cut-off apparatus for a part-time 4-wheel drive vehicle which is simple in structure while providing more improved performance, thereby reducing manufacturing costs.

To meet the above need, the present invention provides a differential for a part-time 4-wheel drive vehicle, the differential comprising a differential assembly disposed on a front axle shaft to allow front wheels to turn at different speeds when the vehicle is in a turn, an outer case for receiving power from a power transfer case via a front propeller shaft, the outer case being disposed around the front axle shaft while enclosing the differential assembly, and a clutch lever assembly disposed between the outer case and the differential assembly to selectively couple the outer case to the differential assembly, the clutch lever assembly being mounted on the outer case so as to operate in a coupling direction to the differential assembly by centrifugal force generated when the outer case is rotated by power transmitted from the power transfer case.

The clutch lever assembly comprises at least one lever pivotally mounted on the outer case, the lever being provided near a first end with a coupling projection which is engaged with a recess formed on the differential assembly by centrifugal force generated when the outer case is rotated by power transmitted from the power transfer case, and a return spring for biasing the lever such that the coupling projection is maintained in a disengaged state from the recess of the differential assembly when power is not transmitted from the power transfer case to the outer case.

The lever is provided at a second end with a mass for enhancing pivotal movement of the lever by centrifugal force.

The differential may further comprise an electromagnetic assembly provided in the vicinity of the clutch lever assembly to forcedly disengage the clutch lever assembly from the differential case when the power transmission from the power transfer case is disconnected.

According to another aspect of the present invention, a power cut-off apparatus associated with a differential used in a part-time 4-wheel drive vehicle, the power cut-off apparatus comprises an outer case for receiving power from a power transfer case via a front propeller shaft, the outer case being disposed around an axle shaft while enclosing the differential, and a clutch lever assembly disposed between the outer case and the differential to selectively couple the outer case to the differential, the clutch lever assembly being mounted on the outer case so as to operate in a coupling direction to the differential by centrifugal force generated when the outer case is rotated by power transmitted from the power transfer case.

The clutch lever assembly comprises at least one lever pivotally mounted on the outer case, the lever being provided at a first end with a coupling projection which is engaged with a recess formed on the differential by centrifugal force generated when the outer case is rotated by power transmitted from the power transfer case, and a return spring for biasing the lever such that the coupling projection is maintained in a disengaged state from the recess of the differential when power is not transmitted from the power transfer case to the outer case.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE PREFERRED EMBODIMENTS

Figure 1:
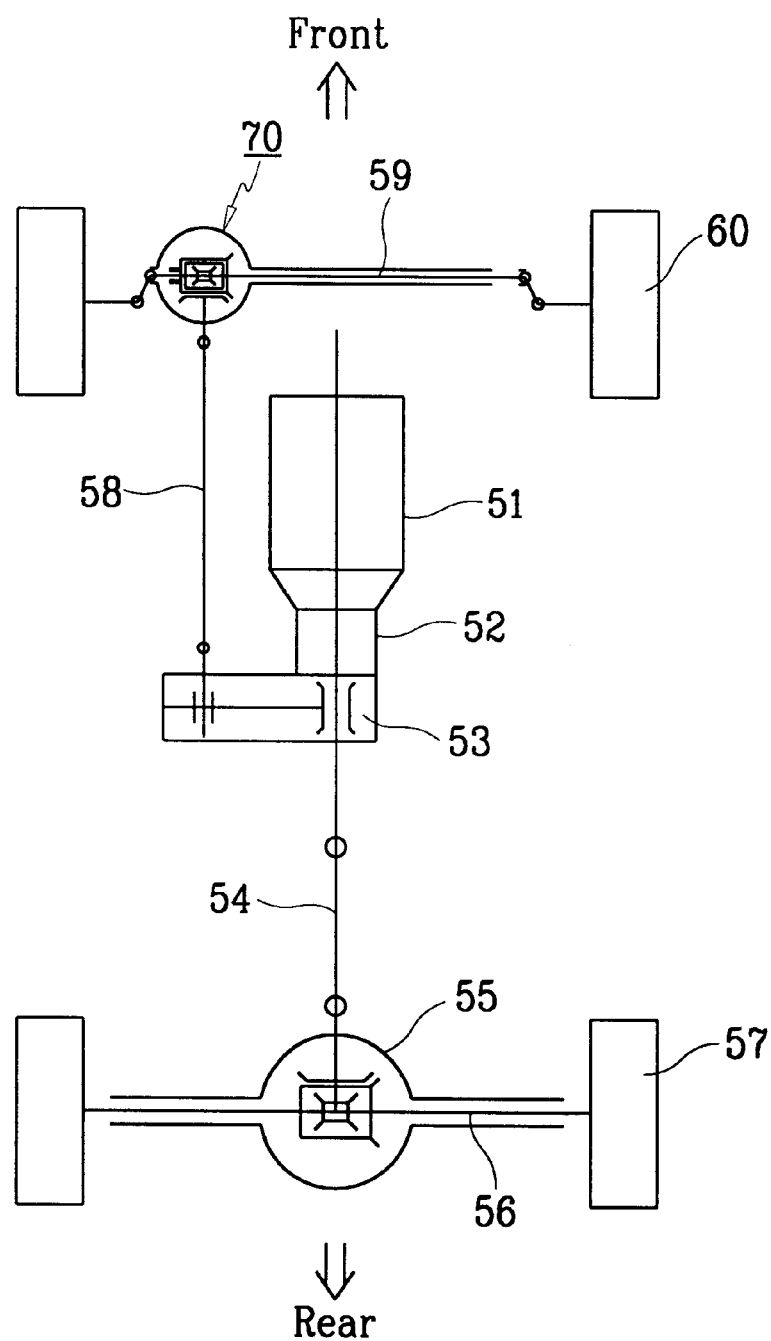
FIG. 1 is a schematic view of a conventional part-time 4-wheel drive vehicle drive train where a differential according to a preferred embodiment of the present invention is employed.

A preferred embodiment of the present invention will now be described in detail with reference to the accompanying drawings. In the description, other parts, which are not closely related to the present invention, will be referenced from FIG. 1, which illustrates a conventional part-time 4-wheel drive vehicle drive train.

Figure 2:
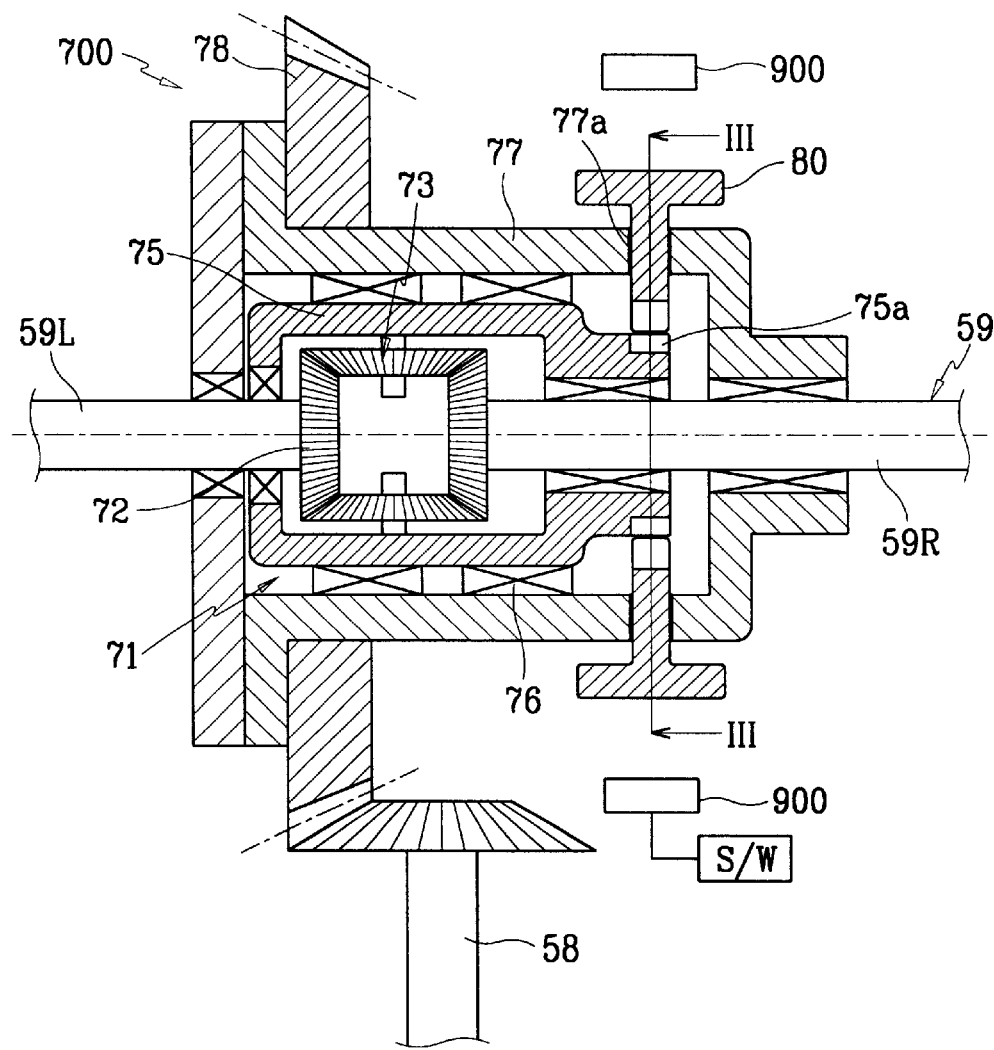
FIG. 2 is a detailed sectional view of a front differential equipped with a power cut-off device for a part-time 4-wheel drive vehicle according to a preferred embodiment of the present invention.

FIG. 2 shows a front differential equipped with a power cut-off apparatus according to a preferred embodiment of the present invention.

The inventive front differential 700 comprises a differential assembly 71 disposed on the front axle shaft 59 to allow the front wheels 60 to rotate at different speeds when the vehicle is in a turn, an outer case 77 for receiving power from the power transfer case 53 via the front propeller shaft 58 and disposed around the front axle shaft 59 while enclosing the differential assembly 71, and a clutch lever assembly 80 disposed between the outer case 77 and the differential assembly 71 to realize a power coupling between the outer case 77 and the differential assembly 71 when power is transmitted to the outer case 77 from the power transfer case 53.

The differential assembly 71 comprises two opposing side gears 72 respectively fixed, when dividing the front axle shaft into two sections 59L and 59R, on opposing ends of the two sections 59L and 59R, two opposing pinion gears 73 meshed with the side gears 72, and a differential case 75 disposed around the front axle shaft 59 with bearings interposed therebetween, while supporting the pinion gears 73.

A ring gear 78 is disposed around the outer case 77 and engaged with the propeller shaft 58 to receiving rotational power from the power transfer case 53. Bearings 76 are interposed between the differential case 75 and the outer case 77 to allow independent rotation between them.

In addition, the clutch lever assembly 80 is mounted through circumferential slots 77a formed in the outer case 77. This will be described in more detail with reference to FIG. 3.

Figure 3:
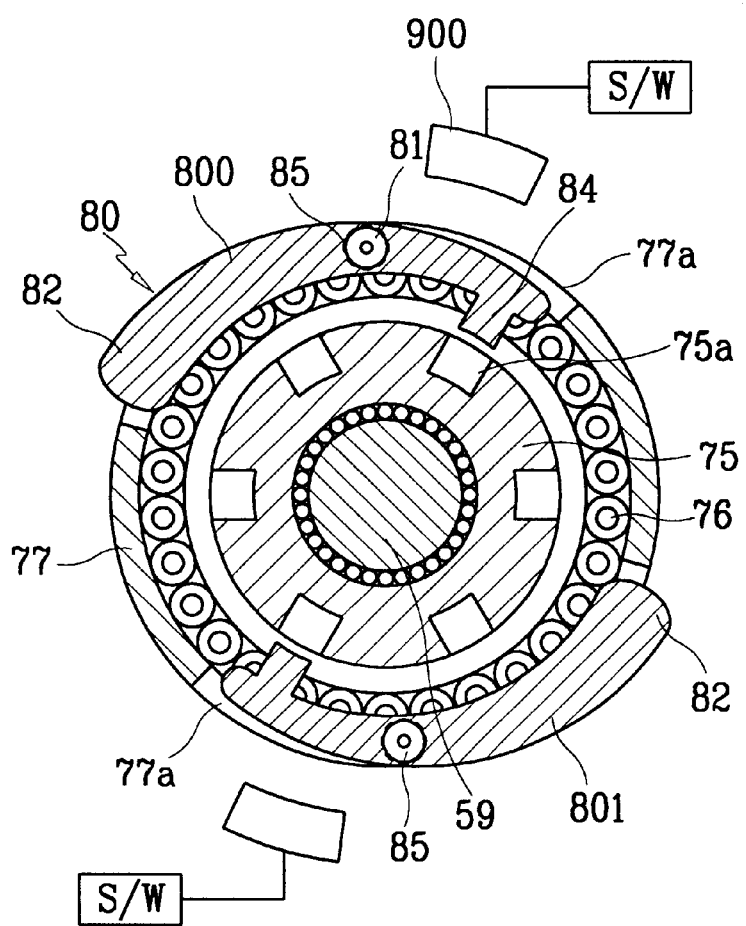
FIG. 3 is a sectional view taken along line III—III of FIG. 2 when the differential is in a 2-wheel drive mode.
Figure 4:
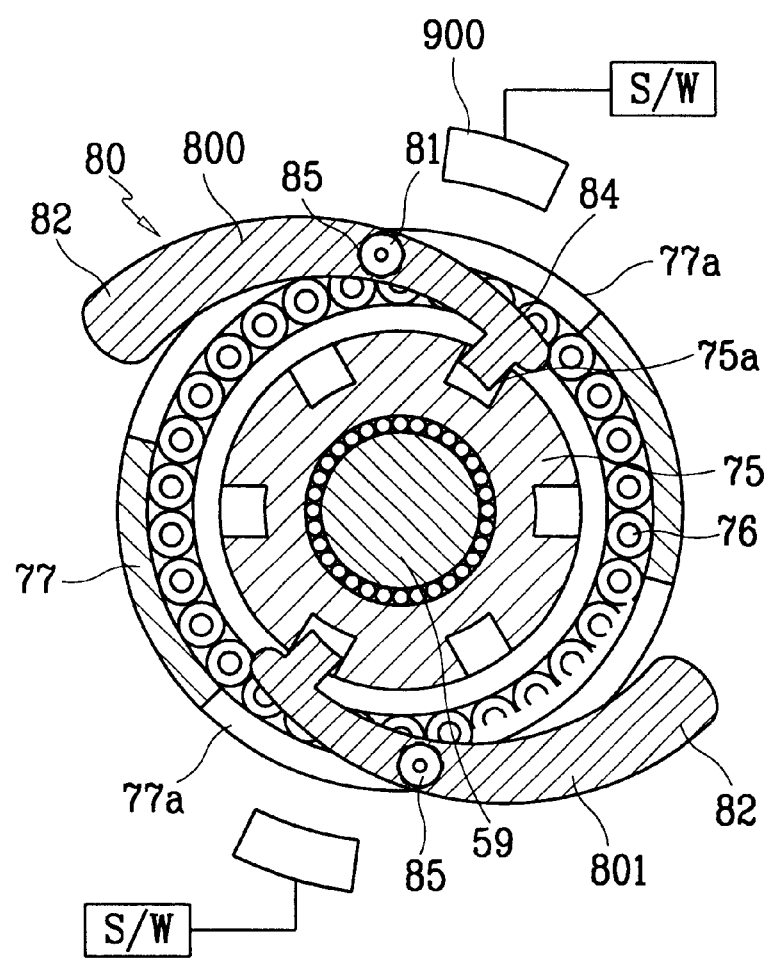
FIG. 4 is a sectional view taken along line III—III of FIG. 2 when the differential is in a 4-wheel drive mode.

FIG. 3 shows a sectional view taken along line III—III of FIG. 2.

The clutch lever assembly 80 comprises two levers 800 and 801 pivotally mounted on side walls defining the circumferential slots 77a by pivot supports 81. The differential case 75 is provided with a plurality of recesses 75a and the levers 800 and 801 are respectively provided with coupling projections 84 which are formed in the vicinity of the respective first ends of the levers 800 and 801 which are to be engaged with the recesses 75a of the differential case 75 by centrifugal force generated when power is transmitted from the power transfer case 53 to the outer case 77. In addition, the levers 800 and 801 are biased by a return spring 85 such that the coupling projections 84 are maintained in a disengagement state from the recesses 75a of the differential case 75 when power is not transmitted from the power transfer case 53 to the outer case 77.

Each second end of the levers 800 and 801 defines a mass portion 82 for enhancing pivotal movement of the lever by centrifugal force.

In addition, the levers 800 and 801 are designed to be disengaged from the differential case 75 by biasing forces of the return springs 85 when the power from the power transfer 53 is cut off. However, if the vehicle travels at high speeds, the disengagement operation by the return springs 85 may not be properly performed. Therefore, according to a present invention, an electromagnetic assembly 900 may be further provided in the vicinity of the levers 800 and 801 to forcedly disengage the levers 800 and 801 from the differential case 75 when the power transmission from the power transfer case 53 is disconnected. The electromagnetic assembly 900 is preferably designed to operate by an operating switch S/W.

The operation of the above-described differential will be described more in detail.

In 2-wheel drive mode, since power transmission from the power transfer case 53 to the front wheels 60 via the front propeller shaft 58 is disconnected, power transmitted from an engine 51 to the transmission 52 is transmitted from the power transfer case 53 to the rear differential 55 via the rear propeller shaft 54, then drives the rear wheels 57 through the rear axle shaft 56.

At this point, as shown in FIG. 3, since the levers 800 and 801 are disengaged from the differential case 75 by the return springs, rotating force of the front wheels 60 is not transmitted to the front propeller shaft 58, thereby preventing power loss and generation of noise.

In 4-wheel drive mode, power is transmitted from the power transfer case 53 to both the front and rear propeller shafts 58 and 54. Therefore, the outer case 77 is rotated by power transferred through the ring gear 78.

At this point, the levers 800 and 801 are pivoted about the pivot support 81 as the mass portions 82 of the levers 800 and 801 are affected by centrifugal force generated by the rotation of the outer case 77, thereby engaging the coupling projections 84 with the recesses 75a formed around the differential case 75. As a result, driving force transmitted to the outer case 77 is further transmitted to the differential case 75 coupled to the clutch lever assembly 80, then to the front wheels 60 via the pinion gears 73 and side gears 72, realizing the 4-wheel drive.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A differential for a part-time 4-wheel drive vehicle, comprising:
    a differential assembly disposed on a front axle shaft to allow front wheels to turn at different speeds when the vehicle is in a turn, said differential assembly including a differential case;
    an outer case for receiving power from a power transfer case via a front propeller shaft, the outer case being disposed around the front axle shaft while enclosing the differential case of the differential assembly, the outer case and differential case being independently rotatable; and
    a clutch lever assembly disposed between the outer case and the differential assembly to selectively couple the outer case to the differential assembly, the clutch lever assembly being mounted on the outer case so as to operate in a coupling direction to the differential case by centrifugal force generated when the outer case is rotated by power transmitted from the power transfer case.

2. A differential of claim 1 wherein the clutch lever assembly comprises: at least one lever pivotally mounted on the outer case, the lever being provided near a first end with a coupling projection which is engaged with a recess formed on the differential case by centrifugal force generated when the outer case is rotated by power transmitted from the power transfer case; and a return spring for biasing the lever such that the coupling projection is maintained in a disengaged state from the recess of the differential case when power is not transmitted from the power transfer case to the outer case.

3. A differential of claim 2 wherein the lever is provided at a second end with a mass for enhancing pivotal movement of the lever by centrifugal force.

4. A differential of claim 1 further comprising an electromagnetic assembly provided in the vicinity of the clutch lever assembly to forcedly disengage the clutch lever assembly from the differential case when the power transmission from the power transfer is disconnected.

5. A power cut-off apparatus associated with a differential enclosed within a differential case used in a part-time 4-wheel drive vehicle, the power cut-off apparatus comprising:

an outer case for receiving power from a power transfer case via a front propeller shaft, the outer case being disposed around an axle shaft while enclosing the differential case, the outer case and differential case being independently rotatable; and a clutch lever assembly disposed between the outer case and the differential to selectively couple the outer case to the differential, the clutch lever assembly being mounted on the outer case so as to operate in a coupling direction to the differential case by centrifugal force generated when the outer case is rotated by power transmitted from the power transfer case.

6. A power cut-off apparatus of claim 5 wherein the clutch lever assembly comprises:

at least one lever pivotally mounted on the outer case, the lever being provided at a first end with a coupling projection which is engaged with a recess formed on the differential case by centrifugal force generated when the outer case is rotated by power transmitted from the power transfer case; and a return spring for biasing the lever such that the coupling projection is maintained in a disengaged state from the recess of the differential when power is not transmitted from the power transfer case to the outer case.

7. A power cut-off apparatus of claim 6 wherein the lever is provided at a second end with a mass for enhancing pivotal movement of the lever by centrifugal force.

8. A power cut-off apparatus of claim 5 further comprising an electromagnetic assembly provided in the vicinity of the clutch lever assembly to forcedly disengage the clutch lever assembly from the differential case when the power transmission from the power transfer case is disconnected.

* * * * *